Patented Apr. 27, 1948

2,440,554

UNITED STATES PATENT OFFICE 2,440,554

PROCESS FOR THE RECOVERY OF RUBBER IN PLANTS BY FERMENTING WITH CLOSTRIDIUM

Joseph Naghski, Philadelphia, Pa., Jonathan W. White, Jr., Washington, D. C., and Samuel R. Hoover, Philadelphia, Pa., assignors to the United States of America as represented by the Secretary of Agriculture No Drawing. Application March 27, 1945, Serial No. 585,178

13 Claims. (Cl. 195—2)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to us of any royalty thereon.

Rubber occurs in the leaves of certain plants in the form of globules or particles which are contained within the protoplasm of the chlorophyll bearing cells of the leaf. The protoplasm of the cell is surrounded by the cell wall, a complex structure containing cellulose, hemicellulose and other constituents. This cell rubber is not recoverable by tapping the latex system of the plant, if it contains such a system, nor is it recoverable by the well-known process of pebble milling the untreated tissue. It must be recovered by some process which separates it from the proteinaceous cell contents in which it is embedded.

It is an object of our invention to recover this cell-rubber in good yield.

In general, our invention comprises fermentation of the leaves by organisms which digest the cell walls, mild mechanical action to detach the rubber-containing protoplasts from the plant debris, separation of the protoplasts from the debris by screening, digestion of the protoplasts with alkali to release the rubber globules, and separation and recovery of the rubber as a latex.

We have found that the cell wall can be digested by certain microorganisms in such a manner that the protoplasts within them and the rubber which is in intimate mixture with the protoplasts can be released from the leaf either as a direct result of the fermentation or by mild mechanical action, such as shaking or stirring. For example, if a suspension of leaves in water is incubated in the presence of *Clostridium roseum* under conditions in which oxygen is essentially excluded, a rapid fermentation takes place. This fermentation is characterized by an initial evolution of gaseous products. The leaves are distended by the gas accumulating within them, and the epidermis may even separate completely from the veins and parenchyma. Concurrently, the cell walls of the parenchyma are digested. At this stage, the protoplasts containing the rubber either fall out of the residuum or can be released by mild mechanical action, such as shaking or stirring.

The separation of the released protoplasts containing the rubber may be accomplished by screening the slurry. The protoplasts pass the screen while the other leaf constituents are retained on the screen. The protoplasts, which are heavier than the liquid, settle out. It is desirable, but not essential, that the protoplasts be washed with water by decantation or centrifugation at this step. By this process, a separation of a rubber-rich fraction is made, and the rubber can then be recovered from the protoplasts.

One method of recovering the rubber present in the protoplasts is by extraction of the rubber from the dried protoplasts with a suitable solvent with or without the prior removal of "resin" by extraction with acetone or related solvent.

Our preferred method of recovery comprises the use of an alkaline solution, in the presence of an antioxidant, at elevated temperature to dissolve or disperse the major portion of the non-rubber constituents of the protoplasts. The released rubber globules, being lighter than the liquid, can be recovered by allowing them to rise and removing them from the surface by skimming, or by subjecting the alkaline liquor to centrifugal separation. The rubber can be washed by dispersing it in water and repeating the separation.

The following example illustrates the manner in which our invention may be practiced:

Two hundred fifty grams of air-dried *Cryptostegia grandiflora* leaves containing 7.47 grams of rubber were suspended in 7 liters of Allison's medium and fermented anaerobically by *Clostridium roseum* for 6 days. At the end of this time, the slurry was stirred vigorously for 30 minutes and screened through a 60-mesh screen. The material remaining on the screen was diluted with water and rescreened. The two portions passing the screen were combined and the protoplasts concentrated by centrifugation. The protoplasts were diluted to 700 cc. and 14 grams of NaOH and 100 mg. of hydroquinone monobenzyl ether, an antioxidant, were added. The suspension was heated to boiling and then cooled. Rapid cooling is preferred. The released rubber globules were recovered by centrifugation and skimming them from the surface. They were then resuspended in water and acidied to pH 4 with acetic acid. The washed globules were coagulated by heating. The yield (moisture-free basis) was 8.3 grams of product, which, by analysis, was found to consist of 62.8% rubber (tetrabromide method), 3.4% benzene and acetone insolubles, and 33.8% acetone extract (by difference).

The protoplasts may be boiled in KOH or trimethylbenzyl ammonium hydroxide instead of NaOH. Primary and secondary amines and Ca(OH)$_2$ are ineffective. Boiling a 10% suspension of protoplasts for 15 minutes in 1.5% NaOH solution gives essentially complete solution of the non-rubber materials present, if the previous steps of the process have been carried out in a satisfactory manner. A good antioxidant for use in this step is 4,4'-diphenylphenylene diamine. Oxidation must also be minimized by cooling the alkaline liquor as soon as the non-rubber constituents are dissolved. Direct microscopic examination of the suspension is helpful in following the progress of dissolution of the protoplasts.

The rubber from the alkaline suspension may be recovered by gravity creaming without added creaming agents. These particles are much larger than the particles of Hevea latex. In one instance, the weight average size was found to be 5.5 microns, and 75% to 85% of the rubber was recoverable by direct creaming. In other instances, the size of the globules has been found to vary with the age of the leaves and other factors. The recovery is as good or better when centrifugal separation is resorted to. The rubber tends to agglomerate in the centrifuge to a "skin" which is difficult to disperse in the ensuing washing operation, in view of which a relative centrifugal force of only about 900 to 1000 times gravity for 10 minutes is desirable. Under these conditions, the rubber can be removed by siphoning or skimming it from the surface and resuspending it in water without coagulation. The centrifugal separation is then repeated or, preferably, the water is acidified to pH 3 to 4.7 with a suitable acid or buffer solution. Acetic acid is well suited for this purpose. In this pH range, the particles aggregate in a reversible manner and readily rise to the surface. We have also found that heating the suspension in this pH region produces an irreversible coagulation of the particles. This phenomenon may be used as a method of coagulation, and the product may then be dried in air or vacuum.

Various modifications of the procedure as described above fall within the scope of this invention. Aerobic fermentation with appropriate organisms also can be used to bring about the type of decomposition of the cell wall. Digestion of the cell walls may also be secured with other Clostridia, and any suitable antioxidants can be employed. The aqueous suspension of rubber particles obtained from this process can be further employed as a latex or treated by various methods common in rubber technology. Besides *Clostridium roseum*, *Clostridium felsinium* has been used successfully in this process. Various suitable antioxidants, in addition to the two mentioned, are phenyl β-naphthylamine and trimethyl dihydroquinoline.

Having thus described our invention, we claim:

1. The process of recovering rubber from Cryptostegia leaves comprising the combination of steps wherein the leaves are first subjected to fermentation by *Clostridium roseum*, permitting fermentation to proceed until the protoplasts containing the rubber globules are released from the cellulose part of the plant, then isolating the released protoplasts and boiling them in an aqueous alkali in the presence of a rubber antioxidant to release the rubber globules and then recovering the rubber.

2. The process of recovering rubber from Cryptostegia leaves comprising the combination of steps wherein the leaves are first subjected to fermentation by a Clostridium organism, permitting fermentation to proceed until the protoplasts containing the rubber globules are released from the cellulose part of the plant, then isolating the released protoplasts and boiling them in an aqueous alkali in the presence of an organic rubber antioxidant to release the rubber globules and then recovering the rubber.

3. A process as defined by claim 2 in which the organism is *Clostridium felsinium*.

4. A process as defined by claim 2 in which the antioxidant is hydroquinone monobenzyl ether.

5. A process as defined by claim 2 in which the antioxidant is 4.4'-diphenylphenylene.

6. The process of recovering rubber from Cryptostegia leaves comprising disintegrating the leaves by fermentation of a sufficient portion of the cellulose part of the leaves to result in a release of the protoplasts, separating the protoplasts from the plant debris, then boiling the separated protoplasts in an aqueous alkali, whereby the rubber globules are released from the protoplasts, inhibiting oxidation of the rubber during the boiling treatment, and then recovering the rubber.

7. The process of recovering rubber from Cryptostegia leaves comprising disintegrating the leaves by fermentation of a sufficient portion of the cellulose part of the leaves with a Clostridium organism to result in a release of the protoplasts, separating the protoplasts from the plant debris, then boiling the separated protoplasts in an aqueous alkali, whereby the rubber globules are released from the protoplasts, inhibiting oxidation of the rubber during the boiling treatment, and then recovering the rubber.

8. The process of extracting rubber from Cryptostegia leaves comprising decomposing portions of the cellulose part of the leaves by fermentation to release the rubber containing protoplasts, separating the protoplasts from the plant debris, dissolving the non-rubber constituents of the separated protoplasts by boiling them in an aqueous alkali solution, whereby rubber globules are released from the protoplasts, inhibiting oxidation of the rubber during the boiling treatment, and then recovering the rubber.

9. The process of extracting rubber from Cryptostegia leaves comprising decomposing portions of the cellulose part of the leaves by fermentation with a Clostridium organism to release the rubber containing protoplasts, separating the protoplasts from the plant debris, dissolving the non-rubber constituents of the separated protoplasts by boiling them in an aqueous alkali solution, whereby rubber globules are released from the protoplasts, inhibiting oxidation of the rubber during the boiling treatment, and then recovering the rubber.

10. A process as defined in claim 7 in which the organism is *Clostridium roseum*.

11. A process as defined by claim 7 in which the organism is *Clostridium felsinium*.

12. A process as defined by claim 9 in which the organism is *Clostridium roseum*.

13. A process as defined by claim 9 in which the organism is *Clostridium felsinium*.

JOSEPH NAGHSKI.
JONATHAN W. WHITE, Jr.
SAMUEL R. HOOVER.

REFERENCES CITED

The following references are of record in the file of this patent:

UNITED STATES PATENTS

| Number | Name | Date |
|---|---|---|
| 886,482 | Dessan | May 5, 1908 |
| 1,753,185 | Spence | Apr. 1, 1930 |
| 1,918,671 | Spence | July 18, 1933 |
| 2,119,030 | Spence | May 31, 1938 |
| 2,365,950 | Haefele et al. | Dec. 26, 1944 |

OTHER REFERENCES

Can. Jour. of Research, vol. 21-B, Oct. 1943.

Buchanan-Bacteriology, 4th Edit., The Macmillan Co.

Spadaro, et al., Rubber Age, page 53, October 1944.

"India Rubber World" of May 1943.